(12) United States Patent
McMasters

(10) Patent No.: US 11,092,367 B2
(45) Date of Patent: Aug. 17, 2021

(54) REFRIGERANT RECOVERY AND RECYCLING SYSTEM WITH SERVICEABLE DEBRIS FILTER

(71) Applicants: Bosch Automotive Service Solutions Inc., Warren, MI (US); Robert Bosch GmbH, Stuttgart (DE)

(72) Inventor: Mark McMasters, Owatonna, MN (US)

(73) Assignees: Bosch Automotive Service Solutions Inc., Warren, MI (US); Robert Bosch GmbH, Stuttgart (DE)

( * ) Notice: Subject to any disclaimer, the term of this patent is extended or adjusted under 35 U.S.C. 154(b) by 249 days.

(21) Appl. No.: 16/143,768

(22) Filed: Sep. 27, 2018

(65) Prior Publication Data
US 2019/0093930 A1    Mar. 28, 2019

Related U.S. Application Data

(60) Provisional application No. 62/563,807, filed on Sep. 27, 2017.

(51) Int. Cl.
| | |
|---|---|
| *F25B 45/00* | (2006.01) |
| *F25B 43/00* | (2006.01) |
| *F25B 43/02* | (2006.01) |
| *B60H 1/00* | (2006.01) |
| *F25B 41/20* | (2021.01) |

(52) U.S. Cl.
CPC ....... *F25B 43/003* (2013.01); *B60H 1/00585* (2013.01); *F25B 41/20* (2021.01); *F25B 43/02* (2013.01); *F25B 45/00* (2013.01); *F25B 2345/001* (2013.01); *F25B 2345/002* (2013.01); *F25B 2345/005* (2013.01); *F25B 2345/006* (2013.01)

(58) Field of Classification Search
CPC ............ F25B 2345/00; F25B 2345/001; F25B 2345/002; F25B 2345/003; F25B 2345/004; F25B 2345/006; F25B 45/00
See application file for complete search history.

(56) References Cited

U.S. PATENT DOCUMENTS

| | | | |
|---|---|---|---|
| 4,768,355 A | 9/1988 | Breuhan et al. | |
| 4,809,515 A | 3/1989 | Houwink | |
| 5,024,061 A | 6/1991 | Pfeil, Jr. et al. | |
| 5,040,382 A | 8/1991 | Abraham | |
| 5,063,749 A | 11/1991 | Manz | |
| 5,187,940 A | 2/1993 | Paxton | |
| 5,273,560 A * | 12/1993 | Kadoya | B01D 29/012 |
| | | | 55/498 |
| 5,295,367 A | 3/1994 | Keltner | |

(Continued)

OTHER PUBLICATIONS

Robinair Service Manual—34788NI, 34788NI-H, 34988NI, ACR225M, & ACR225MH; Recover, Recycle, Recharge Machines Service Manual.

*Primary Examiner* — Frantz F Jules
*Assistant Examiner* — Erik Mendoza-Wilkenfeld
(74) *Attorney, Agent, or Firm* — David Kovacek; Maginot, Moore & Beck LLP

(57) ABSTRACT

An inlet debris filter disposed within a manifold assembly and operable to filter refrigerant that flows through the manifold assembly. In some embodiments, the manifold assembly may be disposed within an air conditioning servicing system. In some embodiments, the inlet debris filter may be removable and serviceable.

7 Claims, 5 Drawing Sheets

(56) References Cited

U.S. PATENT DOCUMENTS

| | | | |
|---|---|---|---|
| 5,379,605 A | 1/1995 | Outlaw et al. | |
| 5,671,605 A | 9/1997 | Helterbrand | |
| 5,709,091 A | 1/1998 | Todack | |
| 5,758,506 A | 6/1998 | Hancock et al. | |
| 5,906,225 A | 5/1999 | Stark et al. | |
| 6,247,325 B1 | 6/2001 | Muston et al. | |
| 6,260,372 B1 | 7/2001 | Burke | |
| 6,408,637 B1 | 6/2002 | Hanson et al. | |
| 7,175,769 B1 * | 2/2007 | Wall | F25B 43/003 |
| | | | 210/739 |
| 7,195,463 B1 | 3/2007 | Wall | |
| 8,800,306 B2 * | 8/2014 | Schoenoff | F04B 9/047 |
| | | | 62/77 |
| 9,593,873 B2 * | 3/2017 | Lundberg | F25B 45/00 |
| 2015/0033788 A1 | 2/2015 | Wang et al. | |

\* cited by examiner

REFRIGERANT RECOVERY AND RECYCLING SYSTEM WITH SERVICEABLE DEBRIS FILTER

TECHNICAL FIELD

This disclosure is directed to the operation and servicing of refrigerant recovery, recharging, and recycling machines used to service cooling systems and air conditioners. It is additionally related to embodiments herein directed to refrigerant recovery, recharging, and recycling machines for use with air conditioners of vehicles.

BACKGROUND

Air conditioning service (ACS) systems are used to perform maintenance of cooling systems and air conditioners (AC). An ACS system can be used to recover refrigerant from an AC for proper reconditioning of the refrigerant according to local laws, to charge the AC with an appropriate quantity of refrigerant, to recharge the AC to appropriate quantities to optimize operation of the AC, or to recycle the refrigerant of an AC in order to purify the refrigerant of non-condensable impurities, or prepare the refrigerant for an additional recovery or recharge operation.

It is expected that impurities will be introduced to the refrigerant in the normal course of operation of an AC, including non-condensable gases and solid particulates or debris. Many ACS systems comprise a filter/drier in the circuit to remove moisture and some amount of contaminants during the recovery process. These filter/driers may be successful at protecting critical elements of the ACS system, such as the compressor, but the filter/driers are placed within the ACS system flow path such that other components upstream of the filter/driers of the ACS system remain exposed to these contaminants.

Previous ACS systems may have used a separate contamination filter outside of the service machine and in series with the service hoses that connect the ACS system to the AC being serviced. An issue with this solution, is that the refrigerant is flowing both into the ACS system during the recovery process through the contamination filter, but then also out of the ACS system during the charge process backwards through the contamination filter, and any debris caught in such hose filters during the recovery process may be flushed back into the AC system during the charge process. This protects the inner workings of the ACS system, but debris remains inside the inner workings of the AC instead, where it can cause damage or malfunction in the AC. Therefore, it is desirable to implement a debris filter of an ACS system that is operable to prevent debris from harming the ACS system without permitting the return of debris to the refrigerant path of the AC during a service operation.

SUMMARY

In one aspect of the present disclosure is directed to an air conditioner service system that includes a serviceable inlet debris filter that protects both the air conditioner service system and the air conditioner from debris in the refrigerant during a service operation without permitting the debris to be flushed into the air conditioner service system or back into the air conditioner.

Another aspect of the disclosure herein is directed to a manifold assembly of an air conditioner service system having a removable filter cartridge housing an inlet debris filter, the removable filter cartridge configured to filter debris to protect the other system components in the manifold flow path. In some embodiments, the debris filter is disposed within the manifold assembly such that refrigerant will only flow through the filter in one direction, thus any debris that is captured will stay in the filter until the filter is removed.

A further aspect of the teachings herein is directed to an embodiment of an air conditioner service system having a reusable inlet debris filter, wherein the air conditioner service system is operable to monitor the status of the inlet debris filter and to indicate to a user when the inlet debris filter must be cleaned. In some embodiments, the reusable inlet debris filter may be bypassed when the status indicates that cleaning is required.

A further aspect of the teachings herein is directed to a removable filter cartridge disposed within a manifold assembly of an air conditioner service system. The removable filter cartridge is operable to provide an inlet debris filter to the manifold assembly configured to protect the components of the air conditioner service system disposed within the manifold assembly.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

It is recognized that some terms of the art may be used interchangeably. The language herein is intended to provide illustration and not limitation to the disclosure, unless otherwise noted within the disclosure. One of ordinary skill in the art will recognize that the teachings herein may be described using alternative terminology or depiction.

Figure 1:
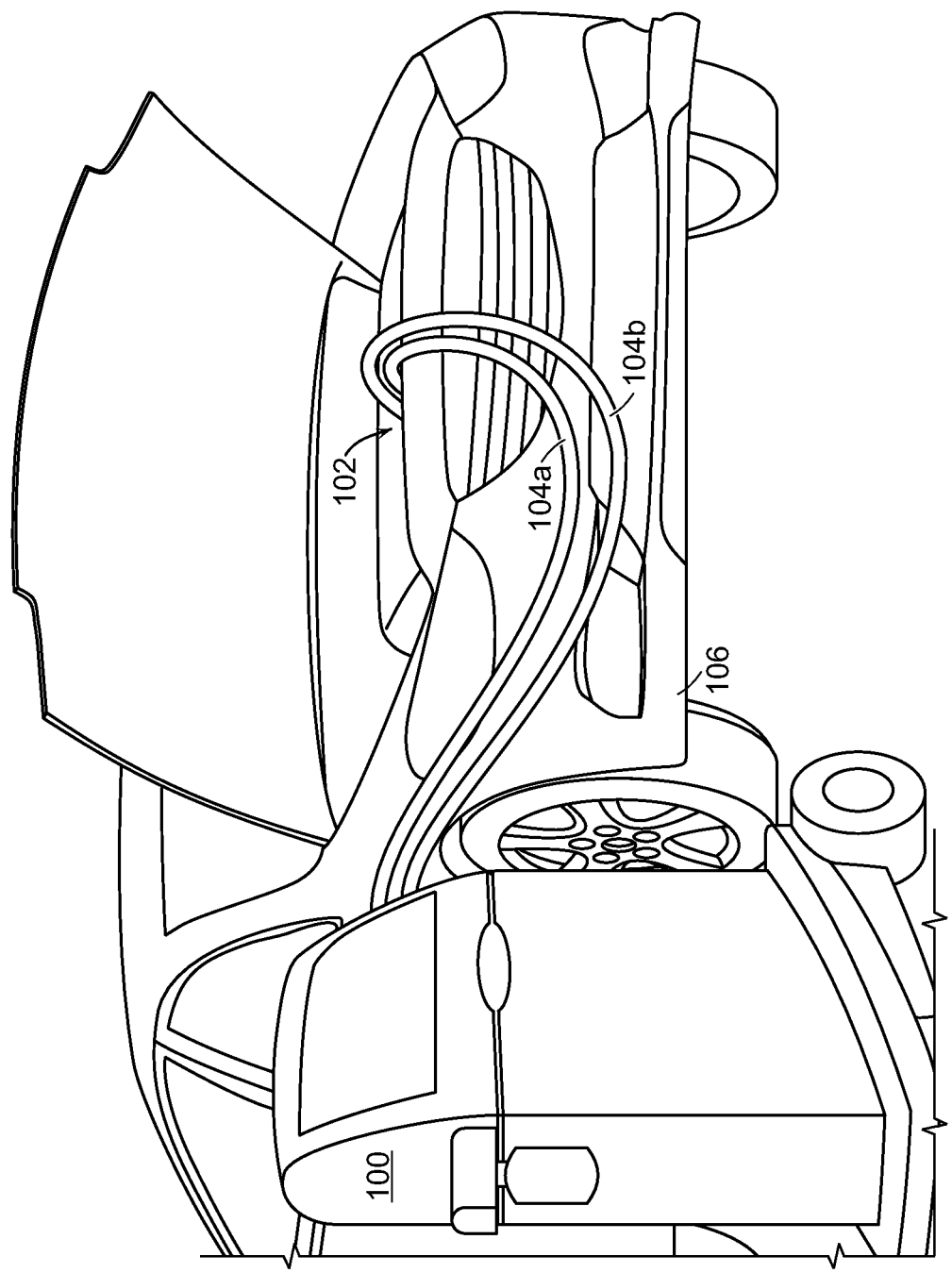
FIG. 1 is a diagrammatic illustration of an air conditioner service system connected to an air conditioner of a vehicle during a service operation.

FIG. 1 depicts an isometric view of an air conditioning service (ACS) system 100 during a service operation of an air conditioner (AC) 102. ACS system 100 is operably connected to AC 102 using a number of hoses 104. In the depicted embodiment, theses hoses comprise a low-side hose 104a and a high-side hose 104b, though other embodiments may comprise a different number of hoses. Low-side hose 104a may also be referred to as a "liquid" connection, so-named because ACS system 100 is configured such that liquid refrigerant is expected to flow through low-side hose 104a from a corresponding port of ACS system 100 to a corresponding port of AC 102. High-side hose 104b may also be referred to as a "gaseous" or "vapor" connection, so-named because ACS system 100 is configured such that gaseous refrigerant is expected to flow through high-side hose 104b from a corresponding port of ACS system 100 to a corresponding port of AC 102. FIG. 1 depicts AC 102 as being disposed within a vehicle 106, but other embodiments of the teachings herein may not comprise vehicle 106.

Figure 2:
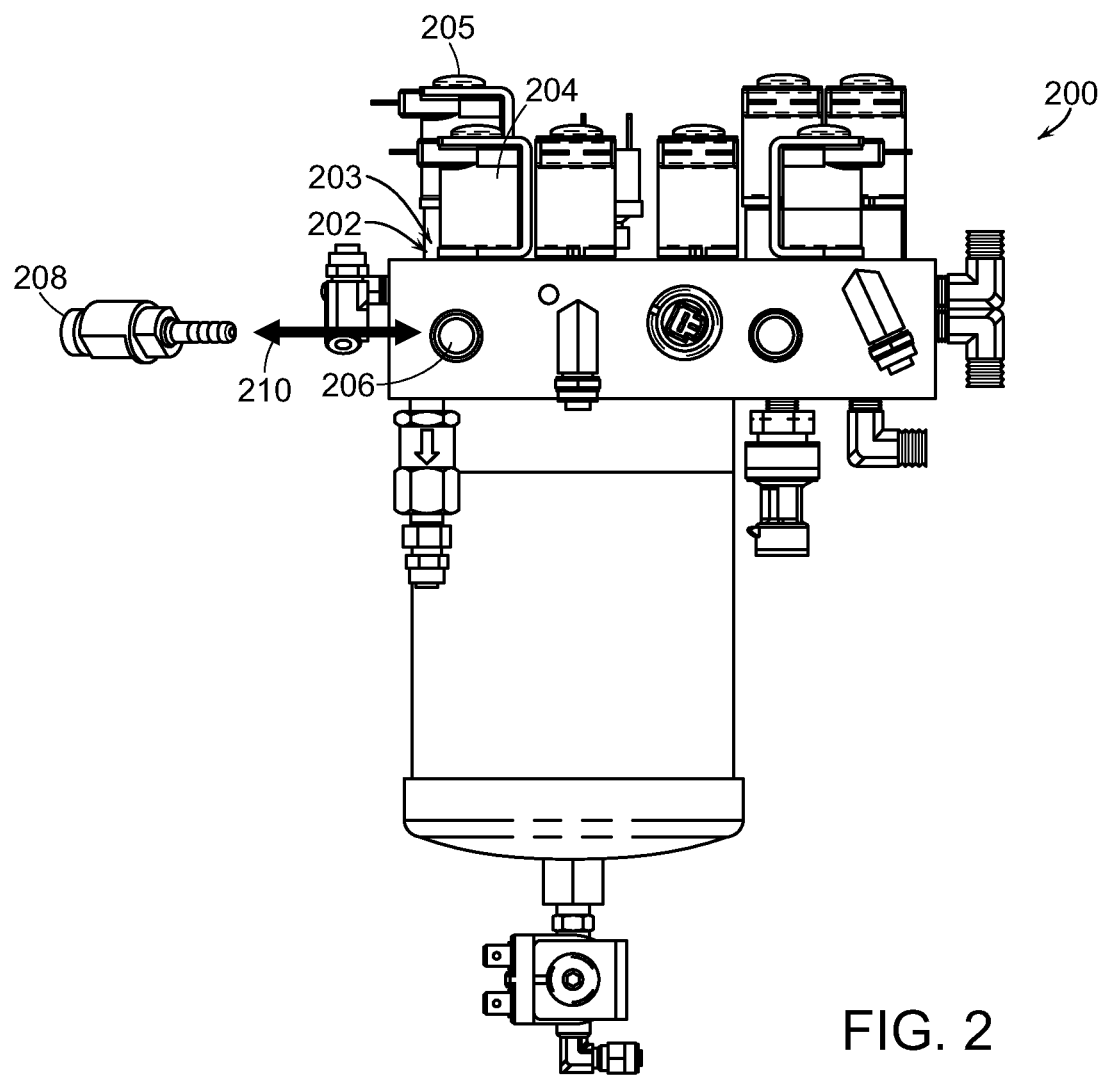
FIG. 2 is a side view of a manifold assembly of an air conditioner service system incorporating a debris filter.

FIG. 2 is a side-view of a manifold assembly 200 providing fluid communication for components of ACS system 100 according an embodiment of the teachings herein. It is recognized that fluid communication can be achieved by channels within manifold assembly 200, the channels being defined by the manifold assembly and configurable using additional elements disposed within the channels. It is recognized that one of ordinary skill in the art would consider the term "channel" to be synonymous with other terms of the art, such as "passage," "flow path," "circuit," "conduit," or the like. For purposes of illustration and not limitation, any of these terms may be used herein exclusively with respect to a one embodiment, but other synonymous terms may be used instead for other embodiments for purpose of clarity. Manifold assembly 200 comprises a number of ports along its periphery to enable fluid communication of the channels therein and connect, through external tubing or structures, with other components of the system not disposed within manifold assembly 200. In the depicted embodiment, these ports comprise at least a low-side inlet port 202 and high-side inlet port 203. In the depicted embodiment, low-side inlet port 202 is configured to have flow from low-side hose 104a (see FIG. 1) controlled by a low-side inlet solenoid 204. In the depicted embodiment, high-side inlet port 203 is configured to have flow from high-side hose 104b (see FIG. 1) controlled by a high-side inlet solenoid 205.

Manifold assembly 200 further comprises a cartridge port 206 configured to receive a filter cartridge 208. Filter cartridge 208 may be removed from or inserted into cartridge port 206 along a direction vector 210. Filter cartridge 208 comprises a debris filter, and when filter cartridge 208 is inserted into cartridge port 206, the debris filter is disposed along a flow path between the inlet ports 202-203 and additional components disposed within the flow paths of manifold assembly 200. Advantageously, manifold assembly 200 may be configured such that the debris filter is disposed between inlet ports 202-203 and their respect inlet solenoids 204-205, which protects low-side inlet solenoid 204 and high-side inlet solenoid 205 from corrosion or mechanical wear caused by debris in the refrigerant. In some embodiments, manifold assembly 200 may comprise a plurality of cartridge ports 206 to receive a corresponding plurality of filter cartridges 208. For example, if manifold assembly 200 comprises a low-side inlet port 202 and a high-side inlet port 203, there may be two distinct cartridge ports 206, each configured to accept a corresponding filter cartridge 208. In other embodiments, manifold assembly 200 may be configured to have a single cartridge port 206 to accept a single filter cartridge 208 in order provide a debris filter for an arbitrary number of inlet ports.

Figure 3:
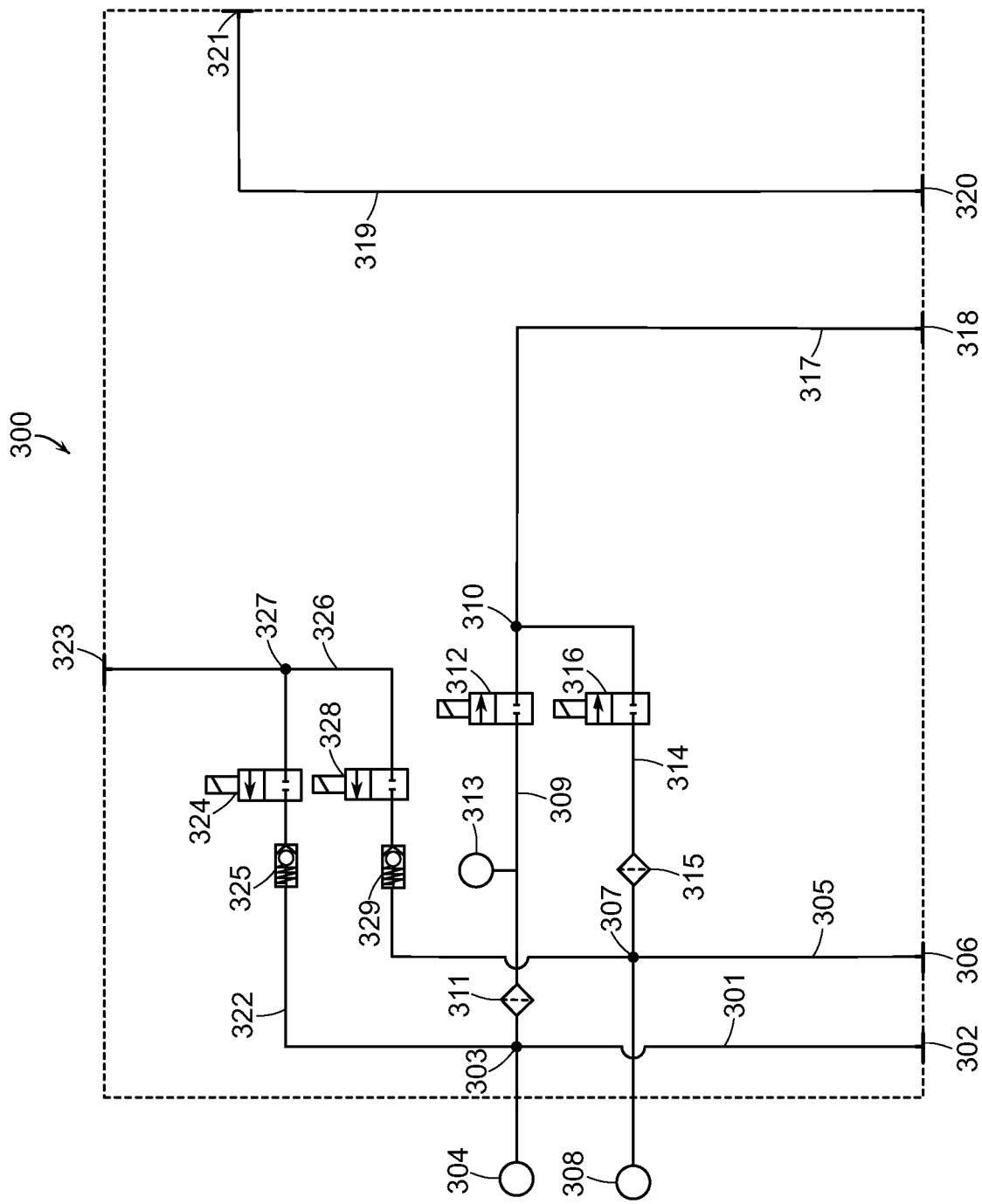
FIG. 3 is a flow diagram of one embodiment of a manifold assembly of an air conditioner service system disclosed herein.

FIG. 3 depicts a flow diagram of a manifold assembly 300 disposed within an ACS system according to one embodiment of the teachings herein. The manifold assembly channels provide operable fluid communication between the channels of manifold assembly 300 and other components of the ACS system. The operable fluid communication of the channels disposed therein may be configured using components disposed within the channels. For the purposes of illustration and not limitation, each "channel" as described herein will refer to a sub-portion of the total flow path of manifold assembly 300 comprising a section of flow path disposed between an arbitrary starting point called a "head terminus", and an arbitrary ending point called a "tail terminus." A terminus may comprise a particular component disposed within the channel, a particular element or aspect of a particular component within the channel, a port providing fluid communication with the channel, or an arbitrary point along the channel. Termini are not necessarily physical features of a channel, and are referred to herein for the purpose of clarity in describing the embodiment. "Head" termini are referred to as such because they are useful starting points to provide clear description of the embodiment, and the term should not be construed to provide any further meaning. "Tail" termini are referred to as such because they are useful ending points to provide clear description of the embodiment, and the term should not be construed to provide any further meaning. It is recognized that one of ordinary skill in the art would consider the term "terminus" to be synonymous with other terms of the art, such as "locus," "endpoint," "extremum," "focus," or the like. For purposes of illustration and not limitation, any of these terms may be used herein exclusively with respect to a one embodiment, but other synonymous terms may be used instead for other embodiments for purpose of clarity. Within manifold assembly 300 one or more channels may intersect, and a point of intersection may be referred to as a "node." It is recognized that one of ordinary skill in the art would consider the term "node" to be synonymous with other terms of the art, such as "junction," "intersection," "vertex," or the like. Nodes are not necessarily physical features of one or more channels, and are referred to herein as such for the purpose of clarity in describing the embodiment. Nodes may or may not serve as a head terminus or tail terminus of one or more channels.

In the depicted embodiment, some channels and components thereof may be described using ordinal signifiers ("a first channel", "a second channel", etc.). These ordinal signifiers are only referred to as such for the purpose of clarity in describing the embodiment and should not be construed to provide any further meaning. One of ordinary skill in the art will recognize that some alternative embodiments may comprise similar but not identical channels. For the purposes of clarity with respect to these alternative embodiments, the channels will be referred to using the same ordinal signifiers, even if use of those labels is not technically correct from a semantic view (e.g., an alternative embodiment may comprise a "first channel" and a "third channel" but not a "second channel"). With respect to the disclosure herein, ordinal signifiers may be considered as an arbitrary labeling mechanism.

With further respect to FIG. 3, manifold assembly 300 defines a first channel 301 with a low-side inlet port 302 serving as a head terminus and a node 303 serving as a tail terminus. Low-side inlet port 302 provides fluid communication of refrigerant between manifold assembly 300 and other components of the surrounding ACS system. In the depicted embodiment, low-side inlet port 302 is configured to be in operable fluid communication of refrigerant with a low-side refrigerant port of the AC during service operations. First channel 301 is characterized by fluid communication with a low-side inlet pressure transducer 304, which in the depicted embodiment is disposed outside of the periphery of manifold assembly 300. Low-side inlet pressure transducer 304 measures the pressure within first channel 301 and is operable to provide those measurements to a user or another component of the ACS system. In some embodiments, low-side inlet pressure transducer 304 may be embodied instead as an analog pressure gauge. In some embodiments, pressure transducer 304 may be disposed within the periphery of manifold assembly 300.

Manifold assembly 300 also comprises a second channel 305 with a high-side inlet port 306 serving as a second head terminus and a node 307 serving as a second tail terminus. High-side inlet port 306 provides fluid communication of refrigerant between manifold assembly 300 and other components of the surrounding ACS system. In the depicted embodiment, high-side inlet port 306 is configured to be in operable fluid communication of refrigerant with a high-side refrigerant port of the AC during service operations. Second channel 305 is characterized by fluid communication with a high-side inlet pressure transducer 308, which in the depicted embodiment is disposed outside of the periphery of manifold assembly 300. High-side inlet pressure transducer 308 measures the pressure within second channel 305 and is operable to provide those measurements to a user or another component of the ACS system. In some embodiments, high-side inlet pressure transducer 308 may be embodied instead as an analog pressure gauge. In some embodiments, high-side inlet pressure transducer 308 may be disposed within the periphery of manifold assembly 300.

Node 303 also functions as a third head terminus for a third channel 309, which is further defined with a node 310 providing a third tail terminus. Disposed within third channel 309 is a low-side inlet debris filter 311 and a low-side inlet solenoid 312. Low-side inlet solenoid 312 is configured to prevent flow of refrigerant between the third head terminus 303 and the third tail terminus 310 when closed. A solenoid, as used herein, is a normally closed valve, via a spring or fluid back-pressure, which may be opened by providing electricity to an electrical solenoid which opens the valve by creating a magnetic field and pulling a metal plunger out of the flow path, although other automated, electrical, magnetic, or manual valves may be used. In the depicted embodiment, low-side inlet debris filter 311 is disposed closer to the third head terminus at node 303 than low-side inlet solenoid 312, but other embodiments may have other arrangements of third channel 309. Advantageously, disposing low-side inlet debris filter 311 nearer to third head terminal 303 protects low-side inlet solenoid 312 from corrosion and malfunction caused by debris in the refrigerant flowing from third head terminus 303.

In some embodiments, low-side inlet debris filter 311 may be configured such that it may be removed from the channel for the purpose of servicing or replacement. In some embodiments, low-side inlet debris filter 311 may be disposed within a filter cartridge, such as depicted in FIG. 2. In some embodiments, low-side inlet debris filter 311 may be reusable, and may be serviced or cleaned as needed when removed before being placed back into third channel 309.

Also disposed within third channel 309 in this embodiment is a filter pressure transducer 313. Filter pressure transducer 313 measures the pressure within third channel 309 and is operable to provide those measurements to a user or another component of the ACS system. The difference between the measurements of filter pressure transducer 313 and low-side inlet pressure transducer 304 may be used to monitor the status of inlet debris filter 311. If the pressure difference is substantially large, low-side inlet debris filter 311 may be clogged and require servicing. In some embodiments, the ACS system may calculate the difference in pressure measurements automatically and provide an indication that the low-side inlet debris filter 311 requires servicing if the difference is above a predetermined threshold value. In the depicted embodiment, the fluid communication point of filter pressure transducer 313 with third channel 309 is disposed between low-side inlet debris filter 311 and low-side inlet solenoid 312, other embodiments may comprise other configurations. In practice, filter pressure transducer 313 will be operable when in fluid communication with any point of third channel 309 disposed between low-side inlet debris filter 311 and third tail terminus 310 when low-side inlet solenoid 312 is open. Advantageously, in embodiments where filter pressure transducer 313 is disposed nearer to third head terminus 303 than low-side inlet solenoid 312, the measurements obtained by filter pressure transducer 313 will be useful even if low-side inlet solenoid 312 is closed. In some embodiments, filter pressure transducer 309 may be embodied instead as an analog pressure gauge. In some embodiments, filter pressure transducer 313 may be disposed outside the periphery of manifold assembly 300, but still in fluid communication with the third channel.

Manifold assembly 300 further comprises a fourth channel 314, disposed between a fourth head terminus at node 307 and a fourth tail terminus at node 310. Disposed within fourth channel 314 is a high-side inlet debris filter 315 and a high-side inlet solenoid 316. High-side inlet solenoid 315 is configured to prevent flow of refrigerant between the fourth head terminus 307 and the fourth tail terminus 310 when closed. In the depicted embodiment, high-side inlet debris filter 315 is disposed closer to the fourth head terminus at node 307 than high-side inlet solenoid 316, but other embodiments may have other arrangements of fourth channel 314. Advantageously, disposing high-side inlet debris filter 315 nearer to fourth head terminal 307 protects high-side inlet solenoid 316 from corrosion and malfunction caused by debris in the refrigerant flowing from fourth head terminus 307.

In some embodiments, high-side inlet debris filter 315 may be configured such that it may be removed from the channel for the purpose of servicing or replacement. In some embodiments, high-side inlet debris filter 315 may be disposed within a filter cartridge, such as depicted in FIG. 2. In some embodiments, high-side inlet debris filter 315 may be reusable, and may be serviced or cleaned as needed when removed before being placed back into fourth channel 314.

It is noted that in the depicted embodiment, node 310 serves as the tail terminus for both third channel 309 and fourth channel 314. Thus, third channel 309 and fourth channel 314 are in fluid communication. In some embodiments, this permits filter pressure transducer 313 to be used to monitor the status of high-side inlet debris filter 315. In embodiments or configurations in which high-side inlet debris filter 315 is in operable fluid communication with filter pressure transducer 313 (e.g., embodiments wherein filter pressure transducer 313 is in direct fluid communication with node 310), the measurements provided by filter pressure transducer 313 can provide an indication that high-side inlet debris filter 315 may require servicing if the pressure difference between the measurements of filter pressure transducer 313 and high-side inlet transducer 308 is above a threshold value. In practice, filter pressure transducer 313 will be operable when in fluid communication with any point of fourth channel 314 disposed between high-side inlet debris filter 315 and fourth tail terminus 310 when low-side inlet solenoid 312 is open and high-side inlet solenoid 316 is open, though in other non-depicted embodiments the status of low-side inlet solenoid 312 may not affect the usability of filter pressure transducer 313 in this manner. In other contemplated embodiments, an additional transducer may be in direct fluid communication with the fourth channel 314 between high-side inlet debris filter 315 and fourth tail terminus 310. In such an embodiment, the utility of the additional transducer to monitor the status of high-side debris inlet filter 315 may or may not depend upon the status of high-side inlet solenoid 316, depending upon the particular point within fourth channel 314 with which the additional transducer is in fluid communication. If the fluid communication point of an additional transducer is disposed between high-side inlet debris filter 315 and high-side inlet solenoid 316, the operable status of high-side inlet solenoid 316 has no particular effect on the utility of pressure differences in monitoring the status of high-side inlet debris filter 315.

Node 310 additionally serves as the fifth head terminus of a fifth channel 317, which also is defined by a fifth tail terminus at a compressor inlet port 318 of manifold assembly 300. Compressor inlet port 318 is configured to be in fluid communication with the inlet of a compressor (not shown) of the ACS system. In the ACS system, the compressor is operable to increase the pressure of refrigerant to ensure that it is placed into a gaseous form. Refrigerant in gaseous form is desirable for certain functions of the ACS system, such as a recovery operation intended to empty the refrigerant from the AC and store the refrigerant into a storage tank. In some embodiments, the compressor may not be active during certain service operations Refrigerant returns from an outlet of the compressor to a sixth channel 319 of manifold assembly 300 via a compressor return port 320, which also serves as a sixth head terminus for sixth channel 319. Sixth channel 319 provides a flow path through manifold assembly 300 between the compressor return port 320 and a tank inlet port 321 also serving as a sixth tail terminus for sixth channel 319. Tank inlet port 321 is configured to provide fluid communication between manifold assembly 300 and an inlet valve of a refrigerant storage tank (not shown). In the depicted embodiment, sixth channel 319 of manifold assembly 300 provides fluid communication between the return of the compressor and an inlet of the storage tank. Other embodiments may have other configurations for providing a flow path between the compressor outlet and the storage tank inlet, including flow paths disposed outside of manifold assembly 300, without deviating from the scope of the disclosure herein.

Manifold assembly 300 also defines a seventh channel 322, starting with a seventh head terminus defined by a tank charge port 323 and ending with a seventh tail terminus at node 303. It is noted that node 303 also serves as the first tail terminus of first channel 301, and thus seventh channel 322 provides a flow path through the manifold assembly 300 from tank charge port 323 to low-side inlet port 302. Tank charge port 323 is configured to be in fluid communication with a refrigerant source disposed externally to the manifold assembly 300, such as the refrigerant storage tank. Disposed within the seventh channel 322 is a low-side charge solenoid 324, configured to operably control flow of refrigerant between seventh head terminus 323 and seventh tail terminus 303. A low-side charge check valve 325 is further disposed within seventh channel 322, and is configured to only permit flow of refrigerant from seventh head terminus 323 toward seventh tail terminus 303. In the depicted embodiment, low-side charge solenoid 324 is disposed within seventh channel 322 nearer to seventh head terminus 323 than low-side charge check valve 325, but other arrangements may be embodied without deviating from the disclosure herein.

Manifold assembly 300 also defines an eighth channel 326. Eighth channel 326 is also defined with an eighth head terminus at tank charge port 323, with the eighth channel 326 branching from the seventh channel 322 at node 327. The eighth channel 326 is further defined by an eighth tail terminus at node 307. Node 307 is disposed within eighth channel 326 between eighth head terminus 323 and the other elements of the eighth channel 326, including a high-side charge solenoid 328 and a high-side charge check valve 329. High-side charge solenoid 328 is configured to operably control flow of refrigerant between the eighth head terminus 323 and the eighth tail terminus 307. High-side charge check valve 329 is configured to only permit flow of refrigerant from eighth head terminus 323 to eighth tail terminus 307.

In the depicted embodiment, node 327 is disposed away from tank charge port 323, but may be disposed at any point disposed between tank charge port 323 and both of low-side charge solenoid 324 and high-side charge solenoid 328. The arrangement of node 327 only requires direct fluid communication with tank charge port 323, and thus in practice node 327 may be considered as the head terminus of either seventh channel 322 or eighth channel 326. In some embodiments, node 327 may effectively be disposed at tank charge port 323.

It is noted that node 303 serves as both the first tail terminus of the first channel 301 and also the seventh tail terminus of the seventh channel 322. Thus, seventh channel 322 is in fluid communication with first channel 301, forming an operable flow path between tank charge port 323 and low-side inlet port 302. Because of the configuration of low-side charge check valve 325, refrigerant can only flow completely from the tank charge port 323 toward the low-side inlet port 302. Similarly, because node 307 serves as the eighth tail terminus of eighth channel 326 and the second tail terminus of second channel 305, an operable refrigerant flow path is formed between tank charge port 323 and high-side inlet port 306. Because of the configuration of high-side charge check valve 329, refrigerant can only flow complete from the tank charge port 323 toward the high-side inlet port 306. Thus, manifold assembly 300 is configurable to perform a charge operation of the ACS system, providing refrigerant from a storage tank to an air conditioner via low-side inlet port 302 and high-side inlet port 306. During a charge operation, low-side inlet solenoid 312 and high-side inlet solenoid 316 are closed, while low-side charge solenoid 324 and high-side charge solenoid 328 are opened to permit refrigerant to flow from tank charge port 323 to low-side inlet port 302 and high-side inlet port 306.

Alternative embodiments may have other configurations for a charge operation without deviating from the teachings herein. As an example, intended for illustration and not limitation, only one of low-side charge solenoid 324 or high-side charge solenoid 328 may be opened to effectively charge the AC using only a single set of channels: seventh channel 322 in combination with first channel 301, or eighth channel 326 in combination with second channel 305.

In the depicted embodiment, manifold assembly 300 is additionally configurable to perform a recovery operation of the ACS system, removing refrigerant from an air conditioner and filling it into a storage tank. During a recovery operation, low-side charge solenoid 324 and high-side charge solenoid 328 are closed, while low-side inlet solenoid 312 and high-side inlet solenoid 316 are opened. Refrigerant can thus flow through the low-side inlet port 302 and high-side inlet port 306 to a compressor via the first channel 301, second channel 305, third channel 309, fourth channel 314 and fifth channel 317. Refrigerant can then flow from the compressor to a storage tank completing a recovery process via sixth channel 319. During this recovery operation, the refrigerant flows through at least one of low-side inlet debris filter 311 and high-side inlet debris filter 315, which removes debris from the refrigerant. Thus, not only are the components of the manifold assembly protected from corrosion and malfunction caused by debris, the compressor will be similarly protected, and no debris will be flushed into the storage tank during the recovery operation.

Figure 4:
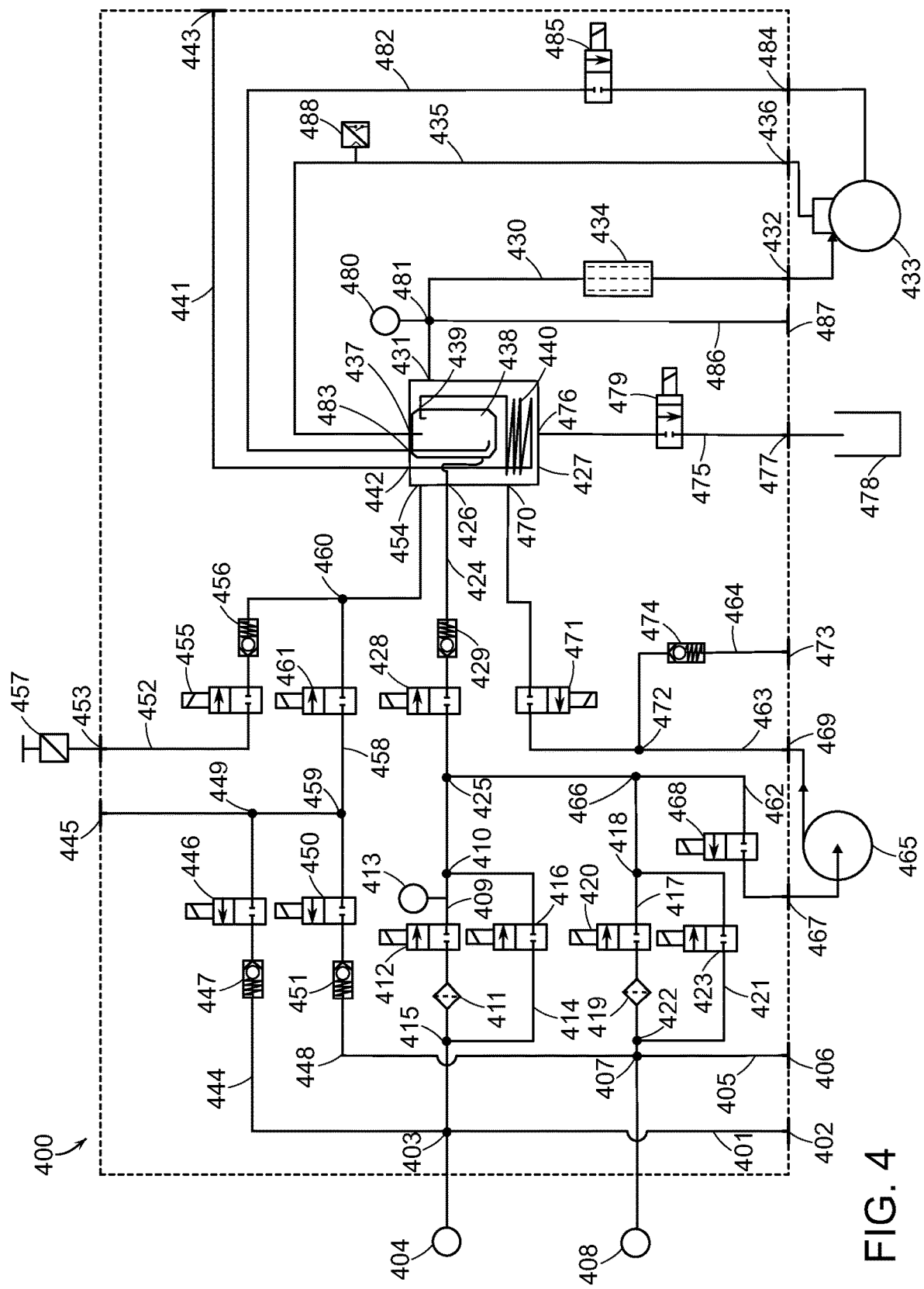
FIG. 4 is a flow diagram of another embodiment of an air conditioner service system disclosed herein.

FIG. 4 depicts a flow diagram another embodiment of an ACS system disclosed herein, having a manifold assembly 400. In the depicted embodiment, manifold assembly 400 is configured to define a number of passages therein, the passages being operable to provide fluid communication to components of the ACS system, including other passages of manifold assembly 400 or components disposed therein.

The operable fluid communication of the passages disposed therein may be configured using components disposed within the passages. It is recognized that one of ordinary skill in the art would consider the term "passage" to be synonymous with other terms of the art, such as "channel," "flow path," "circuit," "conduit," or the like. For the purposes of illustration and not limitation, each "passage" as described herein will refer to a sub-portion of the total flow path of manifold assembly 400 comprising a section of flow path disposed between an arbitrary starting point called a "head terminus", and an arbitrary ending point called a "tail terminus." A terminus may comprise a particular component disposed within the passage, a particular element or aspect of a particular component within the passage, a port providing fluid communication with the passage, or an arbitrary point along the passage. Termini are not necessarily physical features of a passed, and are referred to herein for the purpose of clarity in describing the embodiment. "Head" termini are referred to as such because they are useful starting points to provide clear description of the embodiment, and the term should not be construed to provide any further meaning. "Tail" termini are referred to as such because they are useful ending points to provide clear description of the embodiment, and the term should not be construed to provide any further meaning. It is recognized that one of ordinary skill in the art would consider the term "terminus" to be synonymous with other terms of the art, such as "locus," "endpoint," "extremum," "focus," or the like. Within manifold assembly 300 one or more passages may intersect, and a point of intersection may be referred to as a "node." It is recognized that one of ordinary skill in the art would consider the term "node" to be synonymous with other terms of the art, such as "junction," "intersection," "vertex," or the like. Nodes are not necessarily physical features of one or more channels, and are referred to herein as such for the purpose of clarity in describing the embodiment. Nodes may or may not serve as a head terminus or tail terminus of one or more passages.

In the depicted embodiment, some channels and components thereof may be described using ordinal signifiers ("a first passage", "a second passage", etc.). These ordinal signifiers are only referred to as such for the purpose of clarity in describing the embodiment and should not be construed to provide any further meaning. One of ordinary skill in the art will recognize that some alternative embodiments may comprise similar but not identical passages. For the purposes of clarity with respect to these alternative embodiments, the passages will be referred to using the same ordinal signifiers, even if use of those labels is not technically correct from a semantic view (e.g., an alternative embodiment may comprise a "first passage" and a "third passage" but not a "second passage"). With respect to the disclosure herein, ordinal signifiers may be considered as an arbitrary labeling mechanism.

Manifold assembly 400 defines a first passage 401, being disposed between a low-side inlet port 402 providing a first head terminus and a node 403, providing a first tail terminus. Low-side inlet port 402 is configured to be in fluid communication with a corresponding low-side port of an air conditioner (not shown). First passage 401 is further characterized by fluid communication with a low-side inlet pressure transducer 404, configured to measure the pressure of first passage 401 and provide the measurements to a user or another component of the ACS system. In some embodiments, low-side pressure transducer 404 may instead be embodied as an analog pressure gauge. In the depicted embodiment, low-side inlet pressure transducer 404 is disposed outside of the periphery of manifold assembly 400, but other embodiments may have other configurations without deviating from the teachings herein.

Manifold assembly 400 further defines a second passage 405, being disposed between a high-side inlet port 406 serving as a second head terminus and a node 407 serving as a second tail terminus. High-side inlet port 406 is configured to be in fluid communication with a corresponding high-side port of an air conditioner (not shown). Second passage 405 is further characterized by fluid communication with a high-side pressure transducer 408, configured to measure the pressure of second passage 405 and provide the measurements to a user or another component of the ACS system. In some embodiments, high-side pressure transducer 408 may instead be embodied as an analog pressure gauge. In the depicted embodiment, low-side inlet pressure transducer 404 is disposed outside the periphery of manifold assembly 400, but other embodiments may have other configurations without deviating from the teachings herein.

Node 403 additionally serves as a third heard terminus for a third passage 409. Third passage 409 is additionally defined by a third tail terminus provided by a node 410. Third passage 409 is characterized by a low-side inlet debris filter 411 and a low-side inlet solenoid 412. In the depicted embodiment, low-side inlet debris filter 411 is disposed nearer to third head terminus 403 than low-side inlet debris solenoid 412, but other embodiments may have alternative configurations without deviating from the teachings herein. Advantageously in the depicted embodiment, low-side inlet debris filter 411 is disposed such that it may protect low-side inlet solenoid 412 from corrosion or malfunction caused by debris within the refrigerant.

Third passage 409 is further characterized by fluid connection with a low-side filter pressure transducer 413, configured to measure the pressure of the third passage and operable to provide the measurements to a user or another component of the ACS system. The difference between the measurements of low-side filter pressure transducer 413 and low-side inlet pressure transducer 404 may be used to monitor the status of inlet debris filter 411. If the pressure difference is substantially large, low-side inlet debris filter 411 may be clogged and require servicing. In some embodiments, the ACS system may calculate the difference in pressure measurements automatically and provide an indication that the low-side inlet debris filter 411 requires servicing if the difference is above a predetermined threshold value.

In the depicted embodiment, the fluid communication point of low-side filter pressure transducer 413 with third channel 409 is disposed between low-side inlet solenoid 412 and third tail terminus 410, but other embodiments may comprise other arrangements. In practice, low-side filter pressure transducer 413 will be operable when in fluid communication with any point of third channel 409 disposed between low-side inlet debris filter 411 and third tail terminus 410 when low-side inlet solenoid 412 is open. Advantageously, in embodiments where low-side filter pressure transducer 413 is disposed nearer to third head terminus 403 than low-side inlet solenoid 412, the measurements obtained by low-side filter pressure transducer 413 will be useful even if low-side inlet solenoid 312 is closed. In some embodiments, low-side filter pressure transducer may instead be embodied as an analog pressure gauge. In the depicted embodiment, low-side filter pressure transducer 404 is disposed within the periphery of manifold assembly 400, but other embodiments may have other configurations without deviating from the teachings herein.

Node 403 additionally serves as a fourth head terminus for a fourth passage 415, additionally defined by a fourth tail terminus at node 410. Fourth passage 415 is a parallel passage to third passage 409, branching away at a node 415. In the depicted embodiment, node 415 is disposed away from node 403, but in practice node 415 may be disposed at any point between node 403 and any of low-side inlet debris filter 411 or low-side filter solenoid 412.

Fourth passage 414 is further characterized by a low-side bypass solenoid 416 disposed between fourth head terminus 403 and fourth tail terminus 410. Low-side bypass solenoid 416 is configured to operably control the flow of refrigerant between fourth head terminus 403 and fourth tail terminus 410. In the depicted embodiment, low-side bypass solenoid 416 is normally in a closed state. During service operations of the ACS system, it is desirable that the operation be completed in a timely fashion. If low-side inlet debris filter 411 is clogged with debris, flow velocity through the third passage 409 may be unacceptably slow to complete a service operation in a desired time. To accommodate for unacceptable flow velocity caused by a clogged debris filter, low-side bypass solenoid 416 may be placed into an open state to allow an alternative route past the clogged debris filter. In some embodiments, low-side inlet solenoid 412 may additionally be closed when low-side bypass solenoid 416 is open to optimize flow velocity. In some embodiments, fourth passage 414 may include a debris filter disposed therein. In such embodiments, the debris filter disposed within fourth passage 414 may continue to provide protection of the ACS system components from debris when low-side debris filter 411 is clogged and bypassed by use of the fourth passage 414. In some such embodiments, the passages may be configured such that the debris filter disposed within an unused passage may be removed and serviced during operation of the ACS system. In some embodiments, additional redundant passages may be utilized to optimize flow velocity or provide additional auxiliary flow paths.

Node 407 additionally provides a head terminus for a fifth passage 417, also defined by a tail terminus at a node 418. Fifth passage 417 is characterized by a high-side inlet debris filter 419 and a high-side inlet solenoid 420 disposed therein. In the depicted embodiment, high-side inlet debris filter 419 is disposed nearer to fifth head terminus 407 than low-side inlet debris solenoid 420, but other embodiments may have alternative configurations without deviating from the teachings herein. Advantageously in the depicted embodiment, high-side inlet debris filter 419 is disposed such that it may protect high-side inlet solenoid 420 from corrosion or malfunction caused by debris within the refrigerant.

In the depicted embodiment, fifth tail terminus 418 is in fluid communication with node 410, and thus low-side filter pressure transducer 413 may be used to measure the pressure of fifth passage 417, particularly when high-side inlet solenoid 420 is an open state. Thus, the status of high-side inlet debris filter 419 can be monitored based upon the difference in measurements of the low-side filter pressure filter transducer 413 and the high-side inlet pressure transducer 408. If the difference between the measurements is sufficiently large, this may indicate a need to service high-side inlet debris filter 419. In some embodiments, instead of relying upon direct fluid communication between the fifth tail terminus and node 410, an additional pressure transducer may instead be disposed within the fifth passage 417. Advantageously, an additional pressure transducer disposed between high-side inlet debris filter 419 and high-side inlet solenoid 420 results in a measurement of the pressure in the fifth passage 417 that does not depend on the arrangement or state of high-side inlet solenoid 420 to useful in determining the condition of high-side inlet debris filter 419.

Node 407 additionally serves as a sixth head terminus for a sixth passage 421, additionally defined by a sixth tail terminus at node 418. Sixth passage 421 is a parallel passage to fifth passage 417, branching away at a node 422. In the depicted embodiment, node 422 is disposed away from node 407, but in practice node 422 may be disposed at any point between node 407 and any of high-side inlet debris filter 419 or high-side filter solenoid 420. In the depicted embodiment, node 418 is disposed away from and in direct fluid communication with node 410, but in some embodiments they may comprise a single node.

Sixth passage 421 is further characterized by a high-side bypass solenoid 423 disposed between sixth head terminus 403 and sixth tail terminus 410. High-side bypass solenoid 423 is configured to operably control the flow of refrigerant between sixth head terminus 403 and sixth tail terminus 410. In the depicted embodiment, high-side bypass solenoid 423 is normally in a closed state. During service operations of the ACS system, it is desirable that the operation be completed in a timely fashion. If high-side inlet debris filter 419 is clogged with debris, flow velocity through the fifth passage 417 may be unacceptably slow to complete a service operation in a desired time. To accommodate for unacceptable flow velocity caused by a clogged debris filter, high-side bypass solenoid 423 may be placed into an open state to allow an alternative route past the clogged debris filter. In some embodiments, high-side inlet solenoid 420 may additionally be closed when high-side bypass solenoid 423 is open to optimize flow velocity. In some embodiments, sixth passage 421 may include a debris filter disposed therein. In such embodiments, the debris filter disposed within sixth passage 421 may continue to provide protection of the ACS system components from debris when high-side debris filter 419 is clogged and bypassed by use of the sixth passage 421. In some such embodiments, the passages may be configured such that the debris filter disposed within an unused passage may be removed and serviced during operation of the ACS system. In some embodiments, additional redundant passages may be utilized to optimize flow velocity or provide additional auxiliary flow paths.

In some embodiments, third passage 409, fourth passage 414, fifth passage 417 and sixth passage 421 may be configured to work in tandem during a service operation of the ACS system. For example, during a recovery operation, low-side inlet solenoid 412 and high-side inlet solenoid 420 can each be placed into an open state to permit refrigerant to flow from low-side inlet port 402 and low-side inlet port 406 to the rest of the components of ACS system. If one of low-side inlet debris filter 411 or high-side inlet debris filter 419 should become clogged, refrigerant may still flow at an acceptable velocity through the other passage, and thus low-side bypass solenoid 416 and high-side bypass solenoid 423 may remain closed so that refrigerant is still filtered of debris. If it is determined that the pressure difference on either side of the debris filters is too great, then the low-side bypass solenoid 416 and high-side bypass solenoid 421 may be opened to expedite the recovery operation. Alternatively, in some embodiments only one of third passage 409, fourth passage 414, fifth passage 417, and sixth passage 421 may be utilized at a time by opening only one of low-side inlet solenoid 412, low-side bypass solenoid 416, high-side inlet solenoid 420, or high-side bypass solenoid 421 at a time, with priority given to the inlet solenoids before the bypass solenoids. Other alternative embodiments having other configurations will be apparent to one of ordinary skill in the art without deviating from the teachings herein.

Manifold assembly 400 additionally defines a seventh passage 424, having a seventh head terminus at a node 425 and a seventh tail terminus defined by an accumulator inlet port 426 of an accumulator 427. Seventh head terminus 425 is in fluid communication with node 410, providing direct fluid communication with the third passage 409, fourth passage 414, fifth passage 417, and sixth passage 421. In the depicted embodiment, node 425 is disposed away from node 410, but in some embodiments they may comprise a single node. In the depicted embodiment, node 425 is disposed away from node 418, but in some embodiments they may comprise a single node.

Disposed within seventh passage 424 is a recover solenoid 428 and a recover check valve 429. In the depicted embodiment, recover solenoid 428 is disposed nearer to seventh head terminus 425, but other embodiments may have other arrangements. Recover solenoid 428 is configured to permit flow refrigerant from one or more of the third passage 409, fourth passage 414, fifth passage 417, and sixth passage 421 into accumulator 427, such as during a refrigerant recovery operation of the ACS system. Recover check valve 429 is configured to permit flow of refrigerant from seventh head terminus 425 into accumulator 427 via accumulator inlet port 426, but also to prevent backflow of refrigerant toward seventh head terminus 425 from seventh tail terminus 426.

Inside accumulator 427, refrigerant is stored in a mixture of liquid and gaseous form before advancing to an eighth passage 430. Accumulator 427 is configured such that only gaseous refrigerant may leave accumulator 427 via an accumulator outlet port 431, which also serves as an eighth head terminus for eighth passage 430. Eighth passage 430 is further defined with an eighth tail terminus at a compressor inlet port 432, providing fluid communication with an inlet of a compressor 433. Compressor 433 is configured to increase the pressure of gaseous refrigerant, making it more suitable for storage in a storage tank. In the depicted embodiment, compressor 433 is disposed outside of the periphery of the manifold assembly 400, but other embodiments may have other configurations without deviating from the teachings herein.

Compressor 433 is configured to operate upon refrigerant in gaseous form, and is susceptible to malfunction or damage if exposed to liquid, contaminants, or debris. For this reason, a filter/drier 434 is disposed between eighth head terminus 431 and eighth tail terminus 432. Filter/drier 434 is configured to filter particulates and prevent liquids from entering compressor 433. In the disclosed embodiment, filter/drier 434 is disposed within manifold assembly 400, but other embodiments may have alternative configurations without deviating from the teachings herein.

Manifold assembly 400 further defines a ninth passage 435 having a ninth head terminus at a compressor return port 436. Ninth passage 435 is further defined by a ninth tail terminus disposed at a compressor-oil separator inlet 437 of a compressor-oil separator 438. In the depicted embodiment, ninth passage 435 provides a flow path of gaseous refrigerant to return from compressor 433 to other components of the ACS system via manifold assembly 400. Because compressor 433 is composed of moving parts, compressor oil may be used to lubricate and protect the compressor 433, and a quantity of compressor oil may become mixed into the refrigerant as it passes through compressor 433. Compressor-oil separator 438 is configured to separate the refrigerant from any compressor oil mixed therein, and thus provide only pure refrigerant to other components within the ACS system. In the depicted embodiment, compressor-oil separator 438 is disposed within accumulator 427 forming an accumulator-separator assembly, but other embodiments may have alternative arrangements. In the depicted embodiment, the accumulator-separator assembly is disposed within the periphery of manifold assembly 400, but other embodiments may have alternative configurations. Because compressor 433 increases the pressure of gaseous refrigerant, the temperature of refrigerant entering compressor-oil separator 438 is increased. Advantageously, because the boiling temperatures of the refrigerant and compressor oil are different, saturated vapor refrigerant further vaporizes, separating the refrigerant from the compressor oil. In an additional advantage, having the compressor-oil separator 438 disposed within accumulator 427 provides an increase in temperature within accumulator 427, which optimizes conditions for accumulated liquid refrigerant therein to evaporate into gaseous form before passing to compressor 433, thus helping to prevent liquid refrigerant from entering compressor 433.

Gaseous refrigerant vaporized in compressor-oil separator 438 is then passed into a heat-exchange coil 440 disposed within accumulator 427 out of a separator vapor outlet 439. The heat-exchange coil 440 further optimizes heat dissipation from the vaporized refrigerant within heat-exchange coil 440 to liquid refrigerant accumulated within accumulator 427. In the depicted embodiment, heat-exchange coil 440 is disposed within accumulator 427, but other embodiments may have other configurations. Some embodiments may not comprise heat-exchange coil 440 without deviating from the teachings herein.

Manifold assembly 400 further defines a tenth passage 441 that is in fluid communication with heat-exchange coil 440 via a heat-exchange outlet port 442, which serves as tenth head terminus of tenth passage 441. A tenth tail terminus of tenth passage 441 is defined by a vapor outlet port 443, which is configured to be in fluid communication with the inlet of a refrigerant storage tank (not shown). Tenth passage 441 is configured to provide a flow path through manifold assembly 400 to a refrigerant storage tank during, for example, a recovery operation of the ACS system.

Manifold assembly 400 further defines an eleventh passage 444, disposed between a tank charge port 445 serving as an eleventh head terminus, and node 403, serving as an eleventh tail terminus. Eleventh passage 444 is further characterized by a low-side charge solenoid 446, configured to operably control flow of refrigerant between eleventh head terminus 445 and eleventh tail terminus 403. Eleventh passage 444 is further characterized by a low-side charge check valve 447, configured to prevent flow from eleventh tail terminus 403 toward eleventh head terminus 445. In the depicted embodiment, low-side charge solenoid 446 is disposed nearer to eleventh head terminus 445 than low-side charge check valve 447, but other embodiments may comprise other arrangements. Because node 403 serves as both the eleventh tail terminus of eleventh passage 444 and the first tail terminus of first passage 401, the two passages are in fluid communication. Thus, manifold assembly 400 is operable to provide a flow path of refrigerant from an external storage tank to the low-side port of the AC (not shown), such as during a charge operation of the ACS to charge the AC with refrigerant. During a charge operation of the ACS, low-side charge solenoid 446 may be in an open state, while low-side inlet solenoid 412 and low-side bypass solenoid 416 should each be in a closed state. Similar configurations will be recognized by one of ordinary skill in the art with respect to other functions of the ACS system, such as a recharge operation.

Tank charge port 445 additionally serves as a twelfth head terminus to a twelfth passage 448, with node 407 serving as its twelfth tail terminus. Twelfth passage 449 branches from eleventh passage 444 at a node 449, in direct fluid communication with twelfth head terminus 445. In the depicted embodiment, node 449 is disposed away from eleventh head terminus 445, but in other embodiments node 449 may be disposed at any point between eleventh head terminus 445 and any of low-side charge solenoid 446 or low-side charge check valve 447, including at tank charge port 445.

Twelfth passage 448 is further characterized by a high-side charge solenoid 450, configured to operably control flow of refrigerant between twelfth head terminus 445 and twelfth tail terminus 407. Twelfth passage 448 is further characterized by a high-side charge check valve 451, configured to prevent flow from twelfth tail terminus 407 toward twelfth head terminus 445. In the depicted embodiment, high-side charge solenoid 450 is disposed nearer to twelfth head terminus 445 than high-side charge check valve 451, but other embodiments may comprise other arrangements. Because node 407 serves as both the twelfth tail terminus of twelfth passage 448 and the second tail terminus of second passage 405, the two passages are in fluid communication. Thus, manifold assembly 400 is operable to provide a flow path of refrigerant from an external storage tank to the high-side port of the AC (not shown), such as during a charge operation of the ACS to charge the AC with refrigerant. During a charge operation of the ACS, high-side charge solenoid 450 may be in an open state, while high-side inlet solenoid 420 and high-side bypass solenoid 423 should each be in a closed state. Similar configurations will be recognized by one of ordinary skill in the art with respect to other functions of the ACS system, such as a recharge operation.

In one embodiment, a charge operation of the ACS system will utilize the flow path formed by eleventh passage 444 and first passage 401 and also the flow path formed by twelfth passage 448 and second passage 405. During this exemplary charge operation, low-side charge solenoid 446 and high-side charge solenoid 450 are placed in an open state, while all of low-side inlet solenoid 412, low-side bypass solenoid 416, high-side inlet solenoid 420, and high-side bypass solenoid 423 are placed in a closed state. Thus, manifold assembly 400 is operably configured to permit refrigerant to flow from a storage tank, though tank charge port 445 to both the low-side and high-side ports of an AC via low-side inlet port 402 and high-side inlet port 406 respectively.

Additional features of manifold assembly 400 are operable to provide additional functions of the ACS system. For example, in the depicted embodiment, manifold assembly 400 further comprises a thirteenth passage 452, having a thirteenth head terminus defined by a tank-fill port 453 configured to be in fluid communication with an external source of refrigerant. The thirteenth passage 452 is further defined by an accumulator tank-fill port 454 acting as a thirteenth tail terminus. Thirteenth passage 454 is further characterized by a tank-fill solenoid 455 configured to operably control flow from thirteenth head terminus 453 to thirteenth tail terminus 454. Thirteenth passage 452 is further characterized by a tank-fill check valve 456 configured to permit flow from thirteenth head terminus 453 to thirteenth tail terminus 454.

Thirteenth passage 452 is configured to provide a rapid-fill function of a storage tank in fluid communication with vapor outlet port 443. An external refrigerant source (not shown) is connected to tank-fill port 453, providing operable fluid communication between the external refrigerant source and thirteenth passage 452. In this configuration, tank-fill solenoid 452 is placed into an open state, creating a flow path between the external refrigerant source and accumulator 427. Compressor 433 can then be engaged to move refrigerant from accumulator 427 into a storage tank (not shown) connected to vapor outlet port 443, as previously described. In some embodiments, external refrigerant source may be connected to tank-fill port 453 using one or more hoses (not shown). In the depicted embodiment, tank-fill port 453 may be in fluid communication with a filter screen 457, configured to filter refrigerant from the external refrigerant source of debris. In the depicted embodiment, filter screen 457 is disposed outside the periphery of manifold assembly 400, though other embodiments may have other arrangements without deviating from the teachings herein. In some embodiments, filter screen 457 may be disposed within the hoses connecting the external refrigerant source to tank-fill port 453. In some embodiments, filter screen 457 is disposed between tank-fill port 453 and the hoses connecting the external refrigerant source thereto. Some embodiments may not include filter screen 457 without deviating from the teachings herein.

Manifold assembly 400 further defines a fourteenth passage 458, disposed between a node 459 serving as a fourteenth head terminus, and a node 460 serving as a fourteenth tail terminus. Node 459 is in direct fluid communication with node 449, thus providing fluid communication between tank charge port 445 and fourteenth passage 548. In the depicted embodiment, node 459 is disposed away from node 449, but in some embodiments they may comprise a single node. Node 460 is in direct fluid communication with the accumulator tank-fill port 454 via thirteenth passage 452. Disposed between fourteenth head terminus 459 and fourteenth tail terminus 460 is a recycle solenoid 461, configured to control operable fluid communication between the fourteenth head terminus 459 and the fourteenth tail terminus 460.

In the depicted embodiment, during a tank-fill operation as disclosed above, recover solenoid 461 is configured in a closed state. Other configurations of the fourteenth passage may be utilized for other operations of the ACS system. For example, during a recycle operation, refrigerant in the AC is first recovered, and then the ACS system is configured to replace the AC refrigerant with fresh refrigerant from the external refrigerant source. For this stage of the process, recycle solenoid 461, low-side charge solenoid 446 and high-side solenoid 450 are configured in an open state. Then when the external refrigerant source is connected to tank-fill port 453 and tank-fill solenoid 455 is configured into an open state, the pressure differential between the empty AC compared to the external refrigerant source will create flow of refrigerant through the thirteenth passage 452, and then through fourteenth passage 458 into eleventh passage 444 and twelfth passage 448. From eleventh passage 444, refrigerant can flow into first passage 401 and out low-side inlet port 402 into the low-side connection of the AC. From twelfth passage 448, refrigerant can flow into first passage 405 and out high-side inlet port 406 into the high-side connection of the AC. In some embodiments, this transfer from the external refrigerant source and the AC may be assisted by an AC compressor component of the air conditioner.

Manifold assembly 400, as depicted, additionally defines a fifteenth passage 462, a sixteenth passage 463 and a seventeenth passage 464, each of which provides functions related to the operation of a vacuum pump 465 of the ACS system. Fifteenth passage 462 is defined by a fifteenth head terminus at a node 466 and a fifteenth tail terminus at a vacuum inlet port 467, configured to be in fluid communication with an inlet of vacuum pump 465. Node 466 is in direct fluid communication with third tail terminus 410, fourth tail terminus 418, and seventh head terminus 425. In the depicted embodiment, node 466 is disposed away from all of third tail terminus 410, fourth tail terminus 418, and seventh head terminus 425, but other embodiments may have other configurations, including a single node to comprise any combination of node 466, third tail terminus 410, fourth tail terminus 418, and seventh head terminus 425. Disposed between fifteenth head terminus 466 and fifteenth tail terminus 467 is a vacuum solenoid 468, configured to control the operable fluid communication between fifteenth head terminus 466 and fifteenth tail terminus 467. Vacuum pump 465 is operable to create a pressure differential to draw refrigerant from passages in fluid communication with fifteenth passage 462 toward vacuum pump 465, wherein the refrigerant is condensed. Vacuum pump 465 is configured to flush the condensed refrigerant into sixteenth passage 463. Sixteenth passage 463 is defined by a sixteenth head terminus at a vacuum pump return port 469 and a sixteenth tail terminus 470 at a deep-recover accumulator inlet 470 of accumulator 427. Disposed between sixteenth head terminus 469 and sixteenth tail terminus 470 is a deep-recover solenoid 471, configured to control the operable flow between sixteenth head terminus 469 and sixteenth tail terminus.

The ACS system is operable to perform a vacuum-pull operation which removes errant fluids from within manifold assembly 400 flow paths, or from the flow paths of a connected air conditioner. After a vacuum-pull operation, the ACS system or the AC will left in a near-vacuum state. An exemplary such errant fluid would be air, which is non-condensable and impedes the operation of an air conditioner, and multiple components of the ACS system such as compressor 433. Manifold assembly further defines a seventeenth passage 464 having a seventeenth head terminus at a node 472, and a seventeenth tail terminus at a vacuum pump exhaust port 473. Node 472 is in direct fluid communication with vacuum pump return port 469. In the depicted embodiment, node 472 is disposed away from vacuum pump return port 469, but in some embodiments node 472 may be disposed at any point disposed between vacuum pump return port 469 and deep-recover solenoid 471. Seventeenth passage 464 is further characterized by a vacuum exhaust check valve 474, configured to permit flow between seventeenth head terminus 472 and seventeenth tail terminus 473.

In an exemplary vacuum-pull operation, an AC first subjected to a recover operation while connected to low-side inlet port 402 and high-side inlet port 406. The AC is thus devoid of refrigerant, but not yet in a near-vacuum state because a quantity of air remains therein. Manifold assembly 400 is then configured such that vacuum solenoid 468 and at least one of low-side inlet solenoid 412, low-side bypass solenoid 416, high-side inlet solenoid 420, and high-side bypass solenoid 423 are in an open state. Advantageously, in embodiments wherein only at least one of low-side inlet solenoid 412 and high-side inlet solenoid 420 are open, refrigerant from the AC will pass through one of low-side inlet debris filter 411 or high-side inlet debris filter 419, thus protecting vacuum pump 465 from malfunction caused by debris. The errant air is then pulled into vacuum 465. Because air is non-condensable, the air will then flow into sixteenth passage 463. Because deep-recover solenoid 471 is in a closed state, the air will instead flow into seventeenth passage 464 to pass exhaust check valve 464. Exhaust check valve 464 is normally forced closed by the atmospheric pressure of the environment beyond the periphery of manifold assembly 400, but as air exists vacuum pump 465, pressure inside seventeenth passage 464 will increase until exhaust check valve 464 is opened, and the air is vented through exhaust port 473. The particular near-vacuum state that is capable of being created will depend upon the specification of vacuum pump 465. In one embodiment, vacuum pump 465 in coordination with compressor 433 is operable to pull the AC to a near-vacuum state having an absolute pressure of less than 1.0 bar, while the compressor 433 is operable to pull an air conditioner to a pressure measuring −4 in-Hg.

As noted previously, compressor 433 may utilize compressor oil to protect and lubricate the moving parts therein, and compressor-oil separator 438 separates refrigerant from compressor-oil that is introduced to the refrigerant as it flows through compressor 433. An air conditioner may also comprise an AC compressor that requires oil for similar reasons, and thus incoming refrigerant may in fact be a mixture of refrigerant and oil. Manifold assembly 400 further defines an eighteenth passage 475 having components to separate incoming refrigerant from oil of the AC. Nineteenth passage 475 is in fluid communication with accumulator 427 via an oil drain outlet 476, which additionally acts as a nineteenth head terminus for nineteenth passage 475. Nineteenth passage 475 is additionally defined by a nineteenth tail terminus at an oil drain port 477, which is configure to be in fluid communication with an oil drain bottle 478. In the depicted embodiment, oil drain bottle 478 comprises a bottle, but other embodiments may comprise other forms of receptacles without deviating from the teachings herein. Nineteenth passage 475 is additionally characterized by an oil drain solenoid 479 disposed between nineteenth head terminus 476 and nineteenth tail terminus 477. Oil drain solenoid 479 is configured to control the operable flow of oil separated from refrigerant in accumulator 427 between oil drain outlet 476 and oil drain port 477. In the depicted embodiment, oil drain solenoid 479 may be placed into an open state when it is determined that the quantity of oil within accumulator 427 is above a threshold value, indicating an overabundance of oil therein that reduces the efficiency of the ACS system. One method for determining a condition of overabundance is by measuring the pressure within accumulator 427. In normal operation, the refrigerant within accumulator 427 is under pressure, causing vaporization. This additionally helps separate the refrigerant from any oil therein, which causes the oil/refrigerant mixture to stratify with the oil at the bottom of the accumulator. In the present embodiment, an accumulator pressure transducer 480 provides a measurement of the pressure within accumulator 427. Oil drain solenoid 479 may be placed into an open state to drain oil from accumulator. In some embodiments, this process is performed manually by a user monitoring the measurements of accumulator pressure transducer 427. In some embodiments, this process is performed automatically by the ACS system. Accumulator pressure transducer 480 is depicted herein in fluid communication with a node 481, disposed within eighth passage 430. However, other embodiments may have alternative arrangements wherein accumulator pressure transducer is in fluid communication with accumulator 427. In the depicted embodiment, accumulator pressure transducer 480 is disposed within the periphery of manifold assembly 400, but other embodiments may have alternative arrangements. In some embodiments, accumulator pressure transducer 480 may instead comprise an analog pressure gauge.

With further regard to oil drain bottle 478, oil drain bottle 478 may be serviced to remove the excess oil from the ACS. In one embodiment, the entire oil drain bottle 478 may be removed from the ACS system to be emptied of excess oil. In another embodiment, oil drain bottle 478 may comprise a drain outlet to empty oil drain bottle into another receptacle. One of ordinary skill will recognize other embodiments having alternative configurations that do not deviate from the teachings herein. In some embodiments, the oil taken from oil drain bottle 478 may be of sufficient quality to be re-used in an air conditioner. In some embodiments, the oil recovered from accumulator 427 may be of the same type as utilized by compressor 433 or vacuum pump 465.

In the depicted embodiment, compressor-oil separator 438 is configured to return compressor oil separated therein from refrigerant to compressor 433. Manifold assembly 400 is configured to define a nineteenth passage 482, having a nineteenth head terminus comprising an oil return straw 483 disposed within compressor-oil separator 438. Nineteenth passage 482 further is defined by an oil return port 484, which is in fluid communication with a compressor-oil inlet of compressor 433. Nineteenth passage 482 is further characterized by an oil return solenoid 485 disposed between nineteenth head terminus 483 and nineteenth tail terminus 484. Oil return solenoid 485 is configured to control the operable fluid communication between the compressor-oil separator 438 and oil return port 484. Oil return solenoid may be opened upon determination that it is appropriate to return oil in compressor-oil separator 438 to compressor 433. In some embodiments, this determination may be made based upon pressure measurements within compressor-oil separator 438, in a manner similar to that described above with respect to accumulator 427. In some embodiments, oil drain solenoid 485 may be placed into an open condition at regular intervals during active operation of compressor 433. The particular load cycle of the oil drain solenoid 485 may be determined based upon the specification of compressor 433, the conditions within compressor-oil separator 438, the particular operation being performed by the ACS system, or any other condition that would be known to one of ordinary skill in the art. In one exemplary embodiment, given by way of example and not limitation, oil return solenoid 485 is initially open during a recover operation for three seconds, and then opened again for an additional three seconds out for every ten-minute interval that compressor 433 is active.

Manifold assembly 400 may define other additional passages that enable additional utility to the ACS system. In the depicted embodiment, a twentieth passage 486 is defined, having a twentieth head terminus at node 481 and a twentieth tail terminus at a service port 487. Service port 487 provides direct fluid communication with accumulator pressure transducer 481, and thus can be used to check the calibration of accumulator pressure transducer 481 against the readings of an external pressure measurement tool. In the depicted embodiment, accumulator transducer 480 is placed into direct fluid communication with twentieth head terminus 481, but other embodiments may have other configurations wherein service port 487 is configured with direct fluid communication to accumulator pressure transducer 481 without deviating from the teachings herein. In some embodiments, service port 487 may be closed using a plug, cap, or other sealing device known to one of ordinary skill in the art (not shown). In some embodiments, service port 487 may be configured as a normally-closed connection valve that may only open when coupled to an appropriate connector or fitting. Other equivalent embodiments of service port 487 will be recognized by one of ordinary skill in the art without deviating from the teachings herein.

Low-side inlet pressure transducer 404 is similarly disposed such that its calibration may be compared to an external pressure measurement tool in fluid communication with low-side inlet port 402. High-side inlet pressure transducers 408 is similarly disposed such that its calibration may be compared to an external pressure measurement tool in fluid communication with high-side inlet port 408. Low-side filter transducer 413 is similarly disposed such that is calibration may be compared to an external pressure measurement tool in fluid communication with either low-side inlet port 402 or high-side inlet port 408, provided that an appropriate combination of low-side inlet solenoid 412, low-side bypass solenoid 416, high-side inlet solenoid 420, and high-side bypass solenoid 423 are placed into an open state.

Also depicted in FIG. 4 is a high pressure cut-off switch 488, disposed within ninth passage 435. High pressure cut-off switch is configured to measure the pressure within the ninth passage 435 and to terminate operation of the ACS system in the event that the pressure therein becomes higher than a threshold value. The threshold value may be chosen such that it represents pressure levels capable of causing failure of components within the ACS system or damage to components of the ACS system, the AC, or interconnections thereof. In the depicted embodiment, high-pressure cut-off switch is configured to disconnect electrical power from the ACS system, stopping operation of vacuum pump 465 and compressor 433. In some embodiments, some of the solenoids disposed within manifold assembly 400 may be normally-closed solenoids, and thus loss of electrical power will close such solenoids. In the depicted embodiment, high-pressure cutoff switch 488 is disposed within ninth passage 435, but other embodiments may comprise alternative configurations without deviating from the teachings herein. Advantageously, in the depicted embodiment, ninth passage 435 is expected to be subjected to the highest pressure levels within manifold assembly 400, being in fluid communication with the output of compressor 433 providing condensed gaseous refrigerant and also with compressor-oil separator 438, which is filled with the condensed gaseous refrigerant and also subjected to additional heat from heat-exchange coil 440 and the pressure within accumulator 427. In some embodiments, manifold assembly 400 may comprise additional cutoff switches. In the depicted embodiment, high pressure cutoff switch is entirely disposed within the periphery of manifold assembly 400, but other embodiments may have alternative configurations with high pressure cutoff switch being in fluid communication with the flow path of manifold assembly 400 or one of the components disposed within manifold assembly 400.

Figure 5:
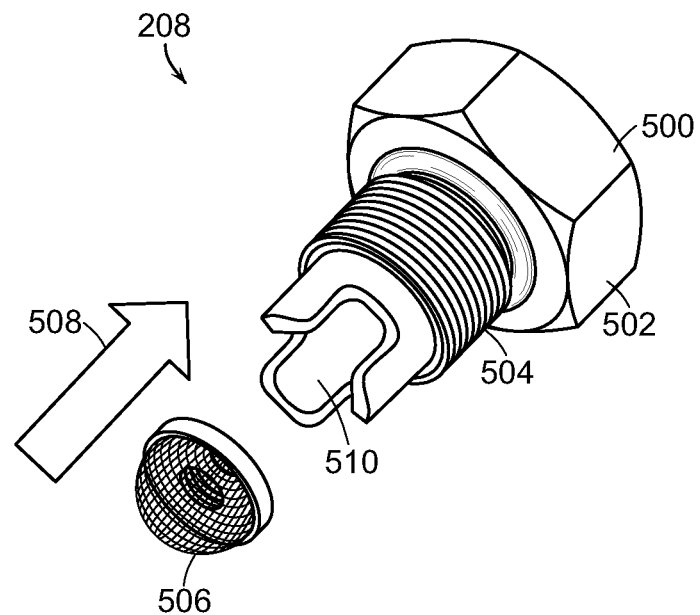
FIG. 5 is an isometric view of a removable filter cartridge, wherein the removable filter cartridge is configured to provide an inlet debris filter in the flow path of a manifold assembly.

FIG. 5 shows an illustration of an embodiment of filter cartridge 208 having an inlet debris filter. The depicted embodiment comprises a cartridge body 500 in the form of a port plug 502, in this case shaped like a bolt-head such that a standard wrench may turn the cartridge body 500, with a fitted insert 504, in this case threaded such that when the cartridge body 500 is turned the fitted insert 504 may thread into an opposing threaded surface of a manifold port. A debris filter 506 fits onto the end of the cartridge body 500 along a horizontal fitting direction 508. When assembled, the filter cartridge 500 may be inserted into a cartridge port of a manifold assembly (see FIG. 2). The manifold assembly may be configured such that the debris filter 502 is placed within the flow path of the manifold assembly via a cross-drilled aperture 510 of the cartridge body 500. FIG. 5 shows one embodiment of a filter cartridge 208, but other embodiments may have different configurations than a cross-drilled aperture to permit flow. In the depicted embodiment, fitted insert 504 comprises a threaded insert, but other embodiments may comprise flanges or another alternative equivalent for coupling cartridge body 500 to a cartridge port.

Debris filter 506 comprises a wire mesh screen affixed to a sealing gasket. Debris filter 506 is configured to be removable from cartridge body 500 when displaced from a cartridge port. The wire mesh screen size is chosen based upon the expected conditions of the refrigerant and the ACS system, but in one exemplary embodiment the screen comprises a 10 micron screen, configured to trap debris having dimensions larger than the mesh of the screen. In the depicted embodiment, the wire mesh screen of debris filter 506 is serviceable such that any debris collected within debris filter 506 can be such that debris filter 506 may be placed back into cartridge body 500 and used again. In one embodiment, servicing of the debris filter 506 to clear collected debris is performed using compressed air to clear the wire mesh screen. In some embodiments, debris filter 506 may not be serviceable. Advantageously, the serviceability of debris filter 506 as described herein may extend the lifetime of debris filter 506 to match that of the ACS system as a whole. In some embodiments, cartridge body 500 may comprise a latching mechanism, couple mechanism, shaped cavity, or other configuration operable to ensure coupling of debris filter 506 to the end of cartridge body 500.

Figure 6:
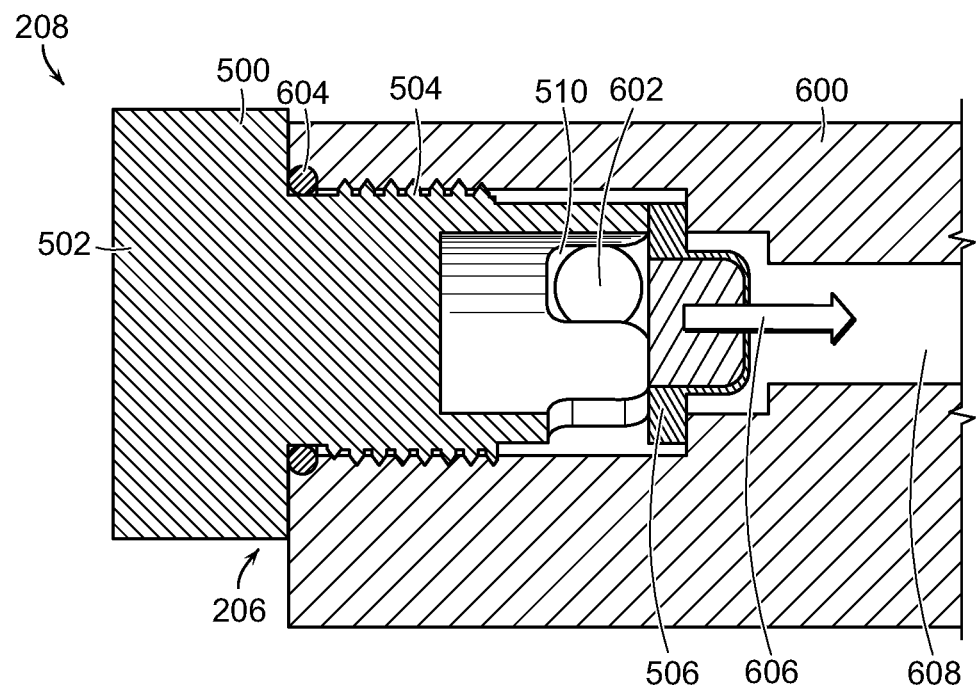
FIG. 6 is a diagrammatic cross-sectional view of a removable filter cartridge when installed in a manifold assembly.

FIG. 6 shows a diagrammatic cross-sectional view of an embodiment of a filter cartridge 208 while coupled to an embodiment of a manifold assembly bloc 600 via cartridge port 206. In the depicted embodiment, the cross-drilled aperture 506 is configured to be in alignment with an inlet aperture 602 defined by the manifold assembly bloc 600. Fitted insert 504 couples with a cavity formed within manifold assembly bloc 600 in such a way to prevent fluid leaks. Cartridge body 500 further comprises an O-ring 604 disposed between port plug 502 and fitted insert 504 configured to seal cartridge port 206 in order to prevent leaks of liquid or gaseous fluids. In the depicted embodiment, fitted insert 504 is threaded to match threads defined by manifold assembly bloc 600, though other embodiments may be configured to accept other configurations of fitted insert 504 without deviating from the teachings herein.

As depicted in FIG. 6, refrigerant flows through inlet aperture 602 and enters the filter cartridge 208 through cross-drilled aperture 510. As refrigerant continues to flow therein, it is flushed past debris filter 502 in a direction 606 into a flow path 608 defined by manifold assembly bloc 600. Thus, any debris larger than the screen mesh of debris filter 506 is trapped behind the screw, and the fluid refrigerant continues to flow past the screen.

Fitted insert 504, O-ring 604 and port plug 502 are configured to prevent any leakage of refrigerant during flow while also sufficiently holding cartridge body 500 in place. Thus, fitted insert 504, O-ring 604 and port plug 502 are configured to hold filter cartridge 208 in place with sufficient force such that the pressure of the flow of refrigerant does not displace filter cartridge 208 from cartridge port 206.

In an aspect of the teachings herein, the manifold assembly bloc 600 is configured such that refrigerant is only expected to flow in direction 606. Because the refrigerant does not backflow against direction 606, the collected debris remains trapped behind debris filter 506 during normal operation of the ACS system. For example, referring back to FIG. 4, low-side inlet debris filter 411 is disposed such that during a recover operation refrigerant will flow from third head terminus 403 toward third tail terminus 410. However, node 410 is in direct fluid communication with seventh passage 424, comprising recover check valve 429, configure to prevent flow of refrigerant from seventh tail terminus 426 toward seventh head terminus 425. Thus, refrigerant will not flow back from third tail terminus 410 toward third head terminus 415, and the collected debris in low-side inlet debris filter 411 will not be flushed out of filter cartridge 208. Other debris filter components of other embodiments of the teachings herein may be similarly advantageously configured. In some embodiments, inlet aperture 602 may comprise additional components to prevent backflow of refrigerant at the filter cartridge 208, such as a check valve or other alternative equivalent known to one of ordinary skill in the art. Because refrigerant does not flush the debris past debris filter 506, and because refrigerant does not flow in the other direction away from filter cartridge 208, debris will remain collected within filter cartridge 208 until such time that it is removed and serviced.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A refrigerant recovery, recharging and recycling system comprising:
 a number of hoses configured to connect the refrigerant recovery, recharging and recycling system to an air conditioning system, the hoses being operable to permit flow of refrigerant in two directions;
 a manifold assembly defining a number of passages in operable fluid communication with the number of hoses, and the manifold assembly configured to permit flow of refrigerant from the air conditioning system to a storage tank, the manifold having a cartridge port disposed within the manifold assembly between an inlet port of the manifold assembly in fluid communication with the hoses and other components disposed within the number of passages of the manifold assembly;

a compressor in fluid communication with the manifold assembly operable to provide the flow of refrigerant from the air conditioning system to the storage tank; and a filter cartridge connected to the manifold assembly at the cartridge port, the filter cartridge having a filter suitable to collect debris within the refrigerant during a refrigerant cycling process, wherein the filter cartridge further comprises a mating plug that keeps the filter cartridge in place during the refrigerant recovery process, the mating plug further comprising a number of inlet flow apertures in fluid communication with the filter and a number of outlet apertures of the filter cartridge in fluid communication with the manifold assembly.

2. The system of claim 1, wherein the operable fluid communication of the manifold assembly is controlled using solenoids or check valves, and the filter cartridge is disposed between the number of hoses and a first of the solenoids or check valves as refrigerant flows from the air conditioning system.

3. The system of claim 1, the manifold assembly further defining:

a low-side port operable to provide fluid communication with one of the number of hoses, a high side port operable to provide fluid communication with the one or another of the number of hoses, a compressor inlet port operable to provide fluid communication with an inlet of the compressor, a compressor return port operable to provide fluid communication with an outlet of the compressor, a tank inlet port operable to provide fluid communication with a tank, a charge port operable to provide fluid communication with the tank;

a first channel characterized by a first head terminus in fluid communication with the low-side port, and a first tail terminus;

a second channel characterized by a second head terminus in fluid communication with the high-side port, and a second tail terminus;

a third channel characterized by a third head terminus in fluid communication with the first tail terminus, a low-side inlet debris filter disposed within the filter cartridge and in fluid communication with the third head terminus, a low-side inlet solenoid disposed between the low-side inlet debris filter and a third tail terminus;

a fourth channel characterized by a fourth head terminus in fluid communication with the second tail terminus, a high-side inlet debris filter disposed within the filter cartridge and in fluid communication with the fourth head terminus, and a high-side inlet solenoid disposed between the high-side inlet debris filter and a fourth tail terminus in fluid communication with the third tail terminus;

a fifth channel characterized by a fifth head terminus in fluid communication with the third tail terminus and a fifth tail terminus configured to be in fluid communication with the compressor inlet port;

a sixth channel characterized by a sixth head terminus in fluid communication with the compressor return port and a sixth tail terminus in fluid communication with a tank inlet port;

a seventh channel characterized by a seventh head terminus in fluid communication with the charge port, a low-side charge solenoid in fluid communication with the seventh head terminus, and low-side charge check valve disposed between the low-side charge solenoid and a seventh tail terminus in fluid communication with the first tail terminus, the low-side charge check valve configured to permit flow from the low-side charge solenoid to the seventh tail terminus; and an eighth channel characterized by an eighth head terminus in fluid communication with the charge port, a high-side charge solenoid in fluid communication with the eighth head terminus, and a high-side charge check valve disposed between the high-side charge solenoid and an eighth tail terminus in fluid communication with the second tail terminus, the high-side charge check valve configured to permit flow from the high-side charge solenoid to the eighth tail terminus.

4. The system of claim 3, the manifold assembly being further characterized by:

the first channel being in fluid communication with a low-side inlet pressure transducer;

the second channel being in fluid communication with a high-side inlet pressure transducer;

the third channel being in fluid communication with a low-side filter transducer, the point of fluid communication of the low-side pressure transducer being disposed in the third channel between the low-side inlet debris and the third tail terminus.

5. The system of claim 1, wherein the filter is operable to be removed from the filter cartridge.

6. The system of claim 5, wherein the filter when removed from the filter cartridge is a serviceable filter that may be re-used after servicing.

7. The system of claim 1, wherein the filter is a 10 micron screen such that collected debris larger than 10 micron is prevented from passing the filter.

* * * * *